(12) United States Patent
Lee et al.

(10) Patent No.: US 6,569,378 B2
(45) Date of Patent: May 27, 2003

(54) APPARATUS FOR MANUFACTURING SOLDER BALLS

(75) Inventors: Jin-Hyung Lee, Daejeonkwangyuk-shi (KR); Byung Chul Moon, Seoul-si (KR); Jin Lee, Kyongki-do (KR); Jeong-Tak Moon, Kyongki-do (KR); Chang-Rok Oh, Kyongki-do (KR); Jae Gyu Nam, Kyongki-do (KR)

(73) Assignee: MK Electron Co., Ltd., Kyongki-do (KR)

( * ) Notice: Subject to any disclaimer, the term of this patent is extended or adjusted under 35 U.S.C. 154(b) by 0 days.

(21) Appl. No.: 09/964,305

(22) Filed: Sep. 26, 2001

(65) Prior Publication Data

US 2002/0005606 A1 Jan. 17, 2002

Related U.S. Application Data

(62) Division of application No. 09/460,573, filed on Dec. 14, 1999, now Pat. No. 6,312,498.

(51) Int. Cl.⁷ .................................................. B22F 9/08
(52) U.S. Cl. ...................... 266/202; 222/594; 228/262
(58) Field of Search ............................... 266/200, 202; 228/33, 260, 262, 56.3; 222/594

(56) References Cited

U.S. PATENT DOCUMENTS 5,988,480 A * 11/1999 Farnworth .................. 228/33
6,312,498 B1 * 11/2001 Lee et al. ................... 75/335

* cited by examiner

*Primary Examiner*—Scott Kastler
(74) *Attorney, Agent, or Firm*—Rankin, Hill, Porter & Clark LLP

(57) ABSTRACT

An apparatus for manufacturing solder balls including a tundish, a vibrator, a cooling liquid tank an inactive atmospheric chamber, a molten metal receiving tray, a ball collecting barrel, and a cooling liquid reservoir. The tundish has orifices at its bottom. The vibrator is immersed in the molten metal of the tundish and generates vibrations. The cooling liquid tank is situated under the tundish and is provided with a cooling liquid heater at its upper and middle outer surface, a cooling liquid cooler at its lower outer surface, and a cooling liquid discharge conduit at its top. The inactive atmospheric chamber is interposed between the bottom of the tundish and the op surface of the cooling liquid. The molten metal receiving tray is seated on a portion of the inactive atmospheric chamber and is horizontally movable. The ball collecting barrel is positioned under the cooling liquid tank and is provided with a cut-off valve at its top, a ball removing valve at its bottom, and a cooling liquid supply conduit at it s upper portion. The cooling liquid reservoir is situated under the ball collecting barrel, is provided with a ball collecting sieve at its inlet and is connected with the cooling liquid discharge conduit and the cooling liquid supply conduit.

2 Claims, 2 Drawing Sheets

APPARATUS FOR MANUFACTURING SOLDER BALLS

CROSS REFERENCE TO RELATED APPLICATION

The present application is a divisional of U.S. patent application Ser. No. 09/460,573, filed Dec. 14, 1999, now U.S. Pat. No. 6,312,498 B1.

BACKGROUND OF THE INVENTION

1. Field of the Invention

The present invention generally relates to a method and apparatus for manufacturing solder balls and, more particularly, to a method and apparatus for manufacturing solder balls for BGA (Ball Grid Array) used recently for electronic packaging.

2. Description of the Related Art

As is well known to those skilled in the art, conventional methods for manufacturing tiny metal balls may be classified into three types: a centrifugal spraying type method, a gas-related type method and a method wherein a metal piece having a uniform weight is molten and forms many balls in liquid and the balls are solidified again. However, with the centrifugal spraying type method and the gas-related type method, ball size is not uniform due to their manufacturing characteristics. Also, a very large apparatus is required for solidifying the balls in gas because the balls are greatly accelerated in the manufacturing process. On the other hand, according to the method wherein a metal piece having a uniform weight is molten and forms many balls in liquid and the balls are solidified again, many processes are required prior to the solidification because metal pieces having uniform weights must be made, thus increasing manufacturing cost. In brief, the conventional methods have low gaining or yield rates and are not economical.

There is another method wherein molten metal flows downward through a small orifice. This method uses a natural phenomenon in which liquid in a fine flow is in an unstable state due to boundary surface tension and the liquid is easily cut and forms many droplets by slight waves on a flowing surface. Lord Rayleigh analyzed this phenomenon and explained that the wavelength of the most unstable wave is about 1.9 times as large as the diameter of the orifice in an article "On the Instability of Jets", London Mathematical Society, 1878. Accordingly, the diameters of the generated droplets have a normal distribution centering at the diameter about 1.9 times as large as the diameter of the orifice. In such a case, when a vibration having a uniform frequency is applied to the liquid, waves having a uniform periodic time are generated on the surface of the liquid passing through the orifice and the waves are cut into fractions having a uniform size, thereby forming many metal balls.

Such a technique using the natural phenomenon is disclosed in "Inkjet Printer of IBM, J, Resent Development" published in 1974, the method of vibrating a disc in molten metal of U.S. Pat. No. 5,266,098 and the method of applying vibrations from the exterior of liquid to the liquid using a speaker of "Power and Powder metallurgy", Vol. 38, No. 6 published in Japan in 1991. However, this method requires a large apparatus because small droplets are easily solidified in the atmosphere, but large droplets need a long falling distance so as to be solidified, may not regulate the size of balls and reduces a gaining rate.

In order to overcome this defect, the method of solidifying droplets using cooling liquid is proposed in "The International Journal of Power Metallurgy", Vol. 32 published in 1996. However, according to this method, since molten metal is boiled at the surface of a droplet upon a droplet falling into cooling liquid, the shape of the ball is determined in accordance with the boundary surface tension and the size of the molten metal, thus deteriorating the surface quality and the degree of sphericity of ball.

SUMMARY OF THE INVENTION

Accordingly, the present invention has been made keeping in mind the above problems occurring in the prior art and an object of the present invention is to provide a method and apparatus for manufacturing solder balls, reducing manufacturing cost due to their simple processes and increasing a production yield or gaining rate due to the uniform size of balls.

In order to accomplish the above object, the present invention provides a method of manufacturing solder balls comprising the step of dividing molten metal into droplets of a uniform size by applying vibrations to the molten metal stream and the step of sphering the droplets by dropping the droplets into cooling liquid that has a temperature gradient ranging from a temperature higher than a melting point of the metal to a normal temperature.

According to another embodiment of the present invention, the cooling liquid may have a boiling point higher than a melting point of the metal, a relatively low density and a relatively low coefficient of viscosity and is not easily reacted with the metal at a normal temperature.

In addition, the present invention provides an apparatus for manufacturing solder balls, comprising a tundish having one or more orifices at its bottom and containing molten metal controllable in its level, a vibrator being immersed in the molten metal of the tundish and generating vibrations, a cooling liquid tank being situated under the tundish and being provided with a cooling liquid heater at its upper and middle outer surface, a cooling liquid cooler at its lower outer surface and a cooling liquid discharge conduit at its top, an inactive atmospheric chamber being interposed between the bottom of the tundish and the top surface of the molten metal, a molten metal receiving tray being seated on a portion of the inactive atmospheric chamber and being horizontally movable, a ball colleting barrel being positioned under the cooling liquid tank and being provided with a cutoff valve at its top, a ball removing valve at its bottom and a cooling liquid supply conduit at its upper portion, and a cooling liquid reservoir being situated under the ball collecting barrel, being provided with a ball collecting sieve at its inlet and being connected with the cooling liquid discharge conduit and the cooling liquid supply conduit.

According to another embodiment, the orifice may be configured to be diminished from its top to its bottom so as to transmit vibrations generated by said vibrator to the stream flowing through the orifice.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
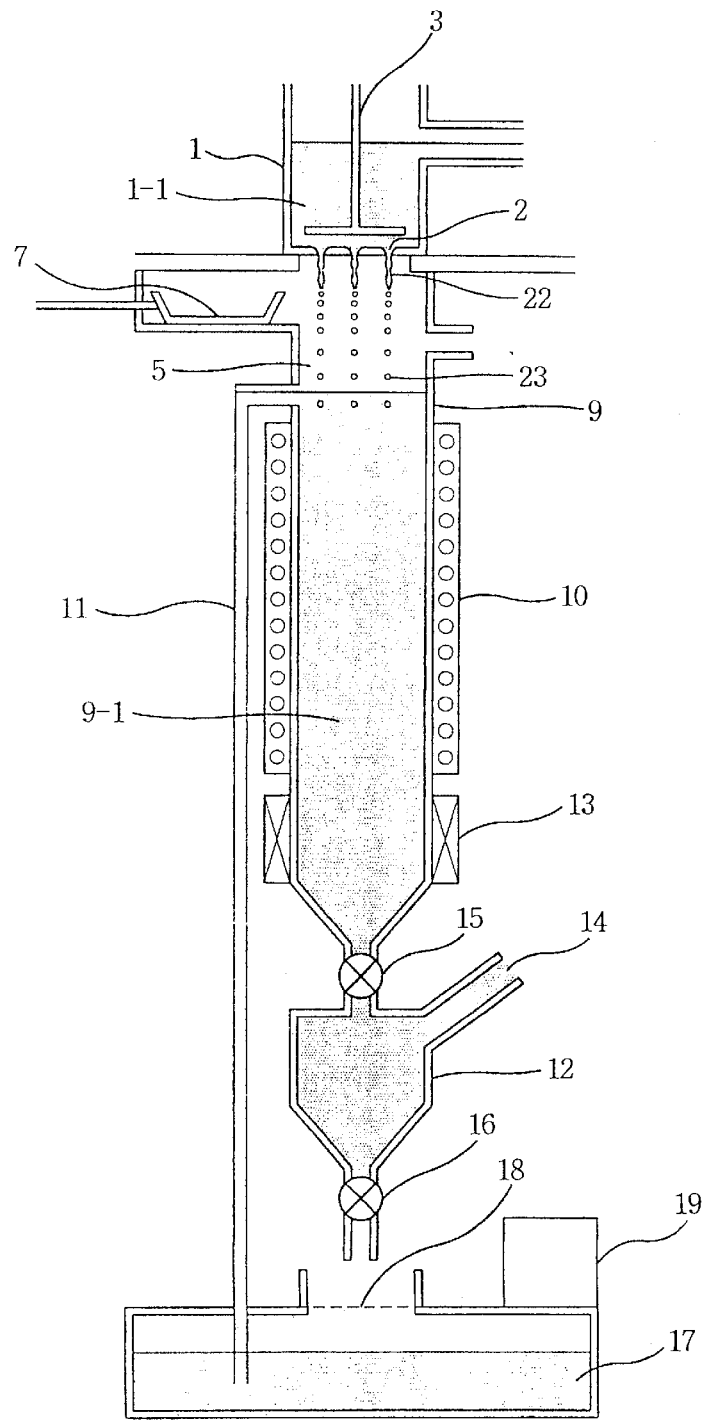
FIG. 1 is an elevational view showing an apparatus for manufacturing solder balls according to the present invention.
Figure 2:
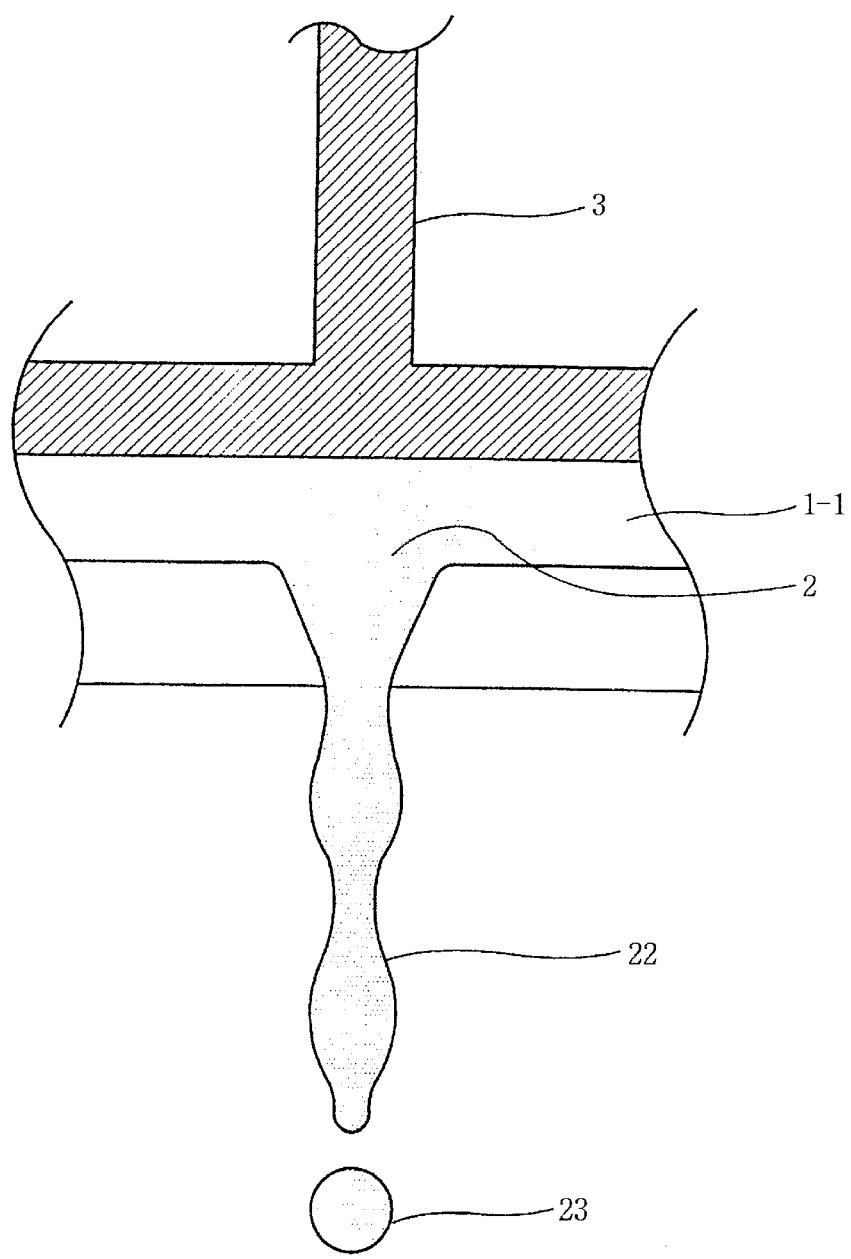
FIG. 2 is a schematical sectional view showing a cross-section of an orifice and the formation of solder balls.

FIG. 1 is an elevational view showing an apparatus for manufacturing solder balls according to the present invention and FIG. 2 is a schematical sectional view showing a cross-section of an orifice and the formation of solder balls.

As shown in FIG. 1, a tundish 1 is positioned in the upper portion of the apparatus. The tundish 1 has one or more orifices 2 at its bottom and contains molten metal controllable in its level. A vibrator 3 is immersed in the molten metal of the tundish 1 and serves to divide a flowing-out stream into droplets by applying vibrations to the molten metal.

A cooling liquid tank 9 is situated under the tundish 1. The cooling liquid tank 9 is provided with a cooling liquid heater 10 at its upper and middle outer surface, a cooling liquid cooler 13 at its lower outer surface and a cooling liquid discharge conduit 11 at its top. The cooling liquid tank 9 contains cooling liquid 9-1, the cooling liquid 9-1 having a boiling point higher than the melting point of the metal, a relatively low density and a relatively low coefficient of viscosity and not being easily reacted with the metal at a normal temperature.

An inactive atmospheric chamber 5 is interposed between the bottom of the tundish 1 and the top surface of the cooling liquid and is filled with inactive gas. A molten metal receiving tray 7 is seated on a portion of the inactive atmospheric chamber 5 and is horizontally movable.

A ball collecting barrel 12 is positioned under the cooling liquid tank 9. The ball collecting barrel 12 is provided with a cut-off valve 15 at its top, a ball removing valve 16 at its bottom and a cooling liquid supply conduit 14 at its upper portion. A cooling liquid reservoir 17 is situated under the ball collecting barrel 12. Cooling liquid reservoir 17 is provided with a ball collecting sieve 18 at its inlet and being connected with the cooling liquid discharge conduit 11 and the cooling liquid supply conduit 14.

The present invention also provides a method for manufacturing solder balls using the above apparatus of the present invention. The method comprises the step of dividing molten metal into droplets 23 of a uniform size by applying vibrations to the molten metal stream 22 and the step of sphering the droplets 23 by dropping the droplets 23 into cooling liquid 9-1 that has a temperature gradient ranging from a temperature higher than a melting point of the metal to a normal temperature.

Hereafter, the operation of the present invention will be described.

First of all, the cooling liquid tank 9 is filled with cooling liquid 9-1 and the cooling liquid is regulated to be maintained in a normal state by operating the cooling liquid heater 10 and the cooling liquid cooler 13. The inactive atmosphere chamber 5 is filled with inactive gas so as to allow the interior of the chamber 5 to be maintained in an inactive atmospheric state. The cooling liquid 9-1 is maintained at a high temperature in its upper portion and at various temperatures in its middle and lower portions by means of the cooling liquid heater 10. The cooling liquid is regulated to have a uniform temperature distribution by the circulation of partial cooling liquid.

In such a case, the cooling liquid 9-1 is supplied through the cooling liquid supply conduit 14. At that time, since the cut-off valve 15 is opened, the cooling liquid 9-1 flows upward through the cut-off valve 15 and fills the cooling liquid tank 9. After the filling of the cooling liquid is completed, the cooling liquid heater 10 and the cooling liquid cooler 13 are operated and regulate the cooling liquid so as to be maintained at a high temperature in its upper portion and at temperatures having in its middle and lower portions.

Thereafter, the tundish 1 is filled with the molten metal and the level of the molten metal is regulated by a molten metal level regulator (not shown). The molten metal flows out through the orifice 2 and thereafter the molten metal separated from the orifice 2 is received by the molten metal receiving tray 7.

When a certain condition is satisfied, the molten metal is directly dropped into the cooling liquid by removing the molten metal receiving tray 7. At this time, vibrations generating sine wave is applied by operating the vibrator 2. Since a wave in the form of the sine wave is generated on the surface of the stream of the molten metal by the vibrations and the wave is unstable at its nodes due to boundary surface tension, the stream is cut at the nodes of the wave, thereby forming balls. The cut stream, that is, balls, is immediately dropped into the cooling liquid. The size of the balls may be regulated by changing the size of the orifice 2, the level of molten metal and the frequency of the vibrator 3. That is, the greater the speed of the flow of the molten metal and the diameter of the orifice 2 are and the smaller the frequency of the vibrations is, the greater the size of the balls is. Since the sphering of balls and the cutting of a uniformly sized balls are hindered in case that the surfaces of the balls are oxidized while the balls are dropped, the chamber 5 is maintained in an inactive atmosphere. When required balls have no limitation in surface quality and sphericity, the balls may be cooled in water.

In the upper portion of the cooling liquid, the metal droplets are decelerated due to its great viscosity and are sphered due to boundary surface tension. While the sphered droplets fall through the cooling liquid, the droplets arrive at the range of temperatures having a temperature gradient. In the range of temperatures, the droplets are cooled and solidified. The completely solidified balls are stacked on the bottom and are collected at regular intervals. The temperature distribution of the cooling liquid is regulated by the cooling liquid heater 10 and is circulated by the rising of the cold cooling liquid supplied through the cooling liquid supply conduit 14 and the following-out of hot cooling liquid discharged through the cooling liquid discharge conduit 11.

Since the size of the apparatus is limited, the balls stacked on the bottom of the ball collecting barrel 12 at regular intervals after the cut-off valve 16 is closed while the apparatus is operated. When the cut-off valve 15 is opened while the ball removing valve 16 is closed and the ball collecting barrel 12 is filled with liquid after the balls are collected, the balls stacked on the cut-off valve 15 fall and newly supplied cooling liquid rises into the cooling liquid tank 9.

Water, oil, molten salt, etc. may be employed as cooling liquid and may be selected in accordance with an applied range of temperature and required quality of the balls. That is, when surface quality of the balls and sphericity of the balls are not high, the balls may be cooled in water; while when surface quality of the balls and sphericity of the balls are high, the balls must be cooled in oil or molten salt.

As described above, the present invention provides a method of and an apparatus for manufacturing solder balls, reducing manufacturing cost due to their simple processes and increasing a gaining rate due to the uniform size of balls.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for manufacturing solder balls, comprising:

a tundish having one or more orifices at its bottom and containing molten metal controllable in its level;

a vibrator being immersed in the molten metal of the tundish and generating vibrations;

a cooling liquid tank being situated under the tundish and being provided with a cooling liquid heater at its upper and middle outer surface, a cooling liquid cooler at its lower outer surface and a cooling liquid discharge conduit at its top;

an inactive atmospheric chamber being interposed between a bottom of the tundish and a top surface of the cooling liquid tank;

a molten metal receiving tray being seated on a portion of the inactive atmospheric chamber and being horizontally movable;

a ball collecting barrel being positioned under the cooling liquid tank and being provided with a cut-off valve at its top, a ball removing valve at its bottom and a cooling liquid supply conduit at its upper portion; and, a cooling liquid reservoir being situated under the ball collecting barrel, being provided with a ball collecting sieve at its inlet and being connected with the cooling liquid discharge conduit and the cooling liquid supply conduit.

2. The apparatus according to claim 1, wherein said orifice is configured to be diminished from its top to its bottom so as to transmit vibrations generated by said vibrator to the stream flowing through the orifice.

* * * * *

UNITED STATES PATENT AND TRADEMARK OFFICE
CERTIFICATE OF CORRECTION

PATENT NO. : 6,569,378 B2
DATED : May 27, 2003
INVENTOR(S) : Lee et al.

It is certified that error appears in the above-identified patent and that said Letters Patent is hereby corrected as shown below:

<u>Title page,</u>
Item [56], References Cited, U.S. PATENT DOCUMENTS, after "6,312,498" insert
-- 2,113,279    4/1938        Olin et al.
   2,287,029    6/1942        Dowdell
   2,398,455    4/1946        Unger
   3,019,485    2/1962        Diamond
   3,063,099    11/1962       Turner et al.
   4,380,518    4/1983        Wydro
   5,266,098    11/1993       Chun et al. --.
-- FOREIGN PATENT DOCUMENTS
JP 61279603 A    12/1986      Hasegawa et al. --.

Signed and Sealed this

Twenty-third Day of September, 2003

JAMES E. ROGAN
*Director of the United States Patent and Trademark Office*